Patented Oct. 10, 1922.

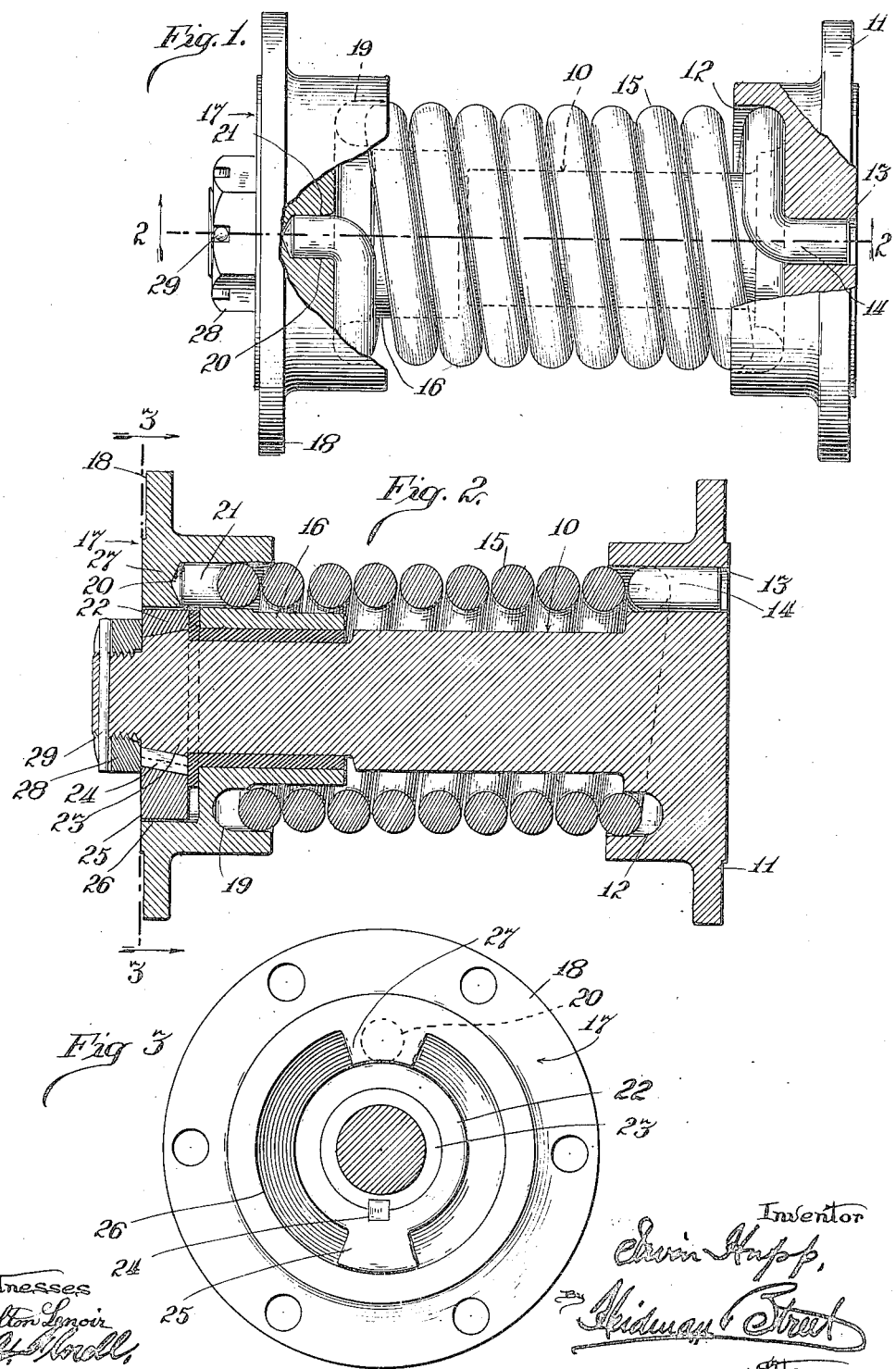

1,431,401

UNITED STATES PATENT OFFICE.

IRVIN HUPP, OF CHICAGO, ILLINOIS, ASSIGNOR TO FLEXO-MOTIVE CORPORATION, OF CHICAGO, ILLINOIS, A CORPORATION OF DELAWARE.

FLEXIBLE COUPLING.

Application filed September 7, 1920. Serial No. 408,685.

*To all whom it may concern:*

Be it known that I, IRVIN HUPP, a citizen of the United States, and a resident of Chicago, in the county of Cook and State of Illinois, have invented certain new and useful Improvements in Flexible Couplings, of which the following is a description, reference being had to the accompanying drawing, which forms a part of my specification.

My invention relates to a coupler more especially intended for flexibly connecting various shafts or shaft sections; being more especially adapted for use on automobiles or other power-driven vehicles; having for its purpose the taking up or absorption of the thrust or shocks encountered by either shaft or shaft section and therefore preventing the transmission of the thrusts or shocks from one shaft or section to the other shaft or section.

The invention contemplates a construction whereby a positive connection between the shafts or shaft sections will be provided in the event of excessive loads on either shaft or section; the positive connection being effected before a complete "seating" of the flexible element or spring is possible, so that crystallization of the spring will be prevented.

The invention also contemplates a construction more especially adapted for use on the driving shaft of an automobile intermediate of the universal joint usually provided in the driving shaft of motor-driven vehicles and the differential mechanism so that the impulses encountered by the driving shaft will be taken up or absorbed and therefore will be yieldingly transmitted to the driven or rear axle sections through the differential mechanism; the construction being such that it may readily be secured by means of suitable flanged members or collars without necessitating any material changes in the general construction of the driving mechanism or shaft of a motor-driven vehicle.

The purpose and advantages of my invention will be readily comprehended from the following detailed description of the accompanying drawing, wherein:—

Figure 1 is a side elevation of my improved coupler with portions broken away and shown in section.

Figure 2 is a longitudinal sectional view taken on the line 2—2 of Figure 1 looking in the direction of the arrows.

Figure 3 is a sectional end view taken on the line 3—3 of Figure 2.

The invention may receive expression in somewhat different mechanical form from that disclosed, but I believe the specific embodiment shown in the drawing to be the simplest and best adaptation of the invention, which comprises an elongated member 10, preferably circular in cross section, although the elongated main portion of said member may be of other cross sectional configuration throughout a major portion of its length. One end of member 10 is enlarged and provided with a flange 11 adapting the member to be secured to a member or flanged collar secured to the driving member of the differential mechanism, (when applied to motor-driven vehicles) so as to rotate therewith.

The enlarged or hub portion at the end of the member 10 is provided with a circumferential groove 12 which is intersected at a given point by a socket or opening 13, disposed substantially parallel with the axis of member 10. The socket 13 is adapted to receive the bent end 14 of a suitable helical spring 15, so that the torque or twist of the spring will be transmitted to the member 10, or vice versa, because of the lodgment of the end 14 in the socket or opening 13. The groove 12 is of such depth that the end coil of the spring 15 will be seated therein and lateral displacement thereby prevented; a portion of the end coil being slightly removed from the bottom of the groove, as shown in Figure 2, so as to permit proper play or action of the spring.

The opposite end of the elongated portion or spindle of member 10 is adapted to receive the hub portion 16 of a member 17. Member 17 is also shown provided with a flange at 18, to adapt the member to be applied to a suitable flange or collar on the propeller or driving shaft of an automobile. The hub portion 16 of member 17 is also provided with a circular groove 19 of proper depth to receive the adjacent end coil of the spring 15 and prevent lateral displacement thereof; and this groove 19 is also provided with a socket or opening at 20, which, like socket 13, is preferably disposed substantially parallel with the longitudinal axis of the device, as very clearly shown in Figure 1, and therefore at right angles to the circular groove 19. The socket 20 is adapted to receive the angularly disposed end 21 of the spring 15 and thereby provide operative relation between member 17 and the spring 15 and in turn provide a yielding or resilient connection between members 10 and 17. The socket or groove 19 is of such construction as to permit a portion of the end coil to seat in the bottom thereof while the remaining portion is shown at a slight distance removed from the bottom of the groove.

The member 17 is shown preferably socketed on its outer face to receive a suitable disk or interlocking member 22. In the particular exemplification, this member 22 is shown internally tapered to correspond with the tapered end 23 of the spindle or elongated portion of member 10, thereby preventing movement of member 22 lengthwise of the member 10 toward the opposite end thereof. The member 22 is also preferably secured to the end of member 10 by means of a suitable key as at 24 to ensure positive rotation of member 22 with member 10. Member 22 is provided with a radially disposed projection or lug 25, preferably shown somewhat sector-shape, as more clearly shown in Figure 3, and of such dimensions as to permit the member 22 with its lug 25 to rotate in the socket 26 of member 17 when member 10 receives rotary movement independent of member 7.

At a predetermined point, member 17 is provided with a radially disposed lug or projection 27 which extends into the socket 26 thereof, see Figure 3; the lug 27, like lug 25, being also preferably shown as somewhat sector-shape to permit the side faces of both lugs 25 and 27 to come into flush and complete contact with each other when the rotative movement of members 10 and 17, relative to each other, is substantially equivalent to a half revolution of either member.

In assembling the respective parts of the device, the disk or member 22, in the particular exemplification, is so positioned and keyed on the spindle or elongated portion of member 10, that the radially disposed lug or projection 25 of member 22 is diametrically opposite to lug or projection 27 formed integral with member 17, when the respective elements or members of the device are in normal position. With this positioning of the members, it is apparent that members 10 and 17 may be given substantially half a revolution, relative to one another, in either direction, before a positive rotative relation between the members 10 and 17 is induced.

It is also evident that the degree of rotative movement of one member relative to the other may be increased or diminished, either by changing the width or dimensions of the two lugs 25 and 27, or by changing the positions of the lugs relative to each other; so that a positive rotative relation between members 10 and 17 may be effected either with a greater or lesser degree of movement; the positioning of the lugs 25, 27 being determined by the particular spring employed and the character of vehicle or load under which the flexible coupling is intended to operate.

The lugs or projections 25 and 27 are intended to function or come into play in advance of a complete "seating" of the spring 15 at times when the shafts, to which members 10 and 17 are secured, are subjected to excessive loads; the positive connection thus effected between the shafts through members 10, disk or member 22 and member 17, preventing crystallization of spring 15.

In order to provide a proper bearing for member 17 on the end of the spindle portion of member 10, I have shown the member 17 provided with an elongated hub which receives a suitable bushing as at 27.

In practice, the spring 15 is so disposed and secured to members 10 and 17 that rotative movement of the shaft, to which member 10 is secured, to drive the automobile or other motor-driven vehicle forwardly, will cause a winding or contracting action on the part of the spring, whereby the pull or twist of the driving shaft of the automobile will be yieldingly transmitted to the driven element of the differential and therefore to the rear or driving axle of the vehicle; the nature of the spring and its arrangement being such that all normal loads or twists of the shafts will be absorbed by the spring; while excessive loads will be taken up by the contacting of lugs 25 and 27 with each other, in advance of a complete winding or "seating" of the spring 15.

When the coupler is assembled, the spring 15 is preferably put into place under slight tension, so that the winding or contracting movement given the spring during rotative movement of member 10, will not tend to withdraw the bent ends of the spring from their respective holes or sockets 13 and 20; the grooves 12 and 19 in members 10 and 17, respectively, being such that the end coils will be protected thereby during a reverse rotation of the shafts which would transmit an unwinding strain or twist to the spring; such unwinding twist causing the end coils to engage the sides of the grooves, thereby preventing strains on the bent ends of the springs; while excessive reverse strains or loads will cause the lugs 25 and 27 to come into abutting relation and provide a positive twisting or rotative relation between members 10 and 17 and therefore the respective shafts to which said members are secured.

By employing a helical spring and arranging the elements as shown and described, considerable torque may be given the spring, which will be such that, in the event of excessive loads, the lugs 25 and 27 will not be forced into violent contact with each, so that even under such conditions, the blows or impulses will not perceptively be transmitted from one shaft or element to the other.

The member or disk 22 may be held on the end of member 10 against removal in any suitable manner, as for example by means of a nut 28 which may screw onto the reduced threaded end of the spindle of member 10 and held against accidental rotation by a suitable pin 29 disposed through holes in the nut 28 and the end of the spindle of member 10 as shown in the drawing.

Having thus described what I believe to be the simplest and best embodiment of my invention, what I wish to secure by Letters Patent is:—

1. A coupler of the character described, comprising a member provided with an elongated portion or spindle and adapted to be secured to the end of the shaft, a second member adapted to be secured to the end of an adjacent, aligned shaft and rotatably mounted on the end of said elongated portion or spindle, the attaching side of the second member being socketed and provided with an inwardly disposed radial lug, a resilient driving connection between the two members and arranged concentric with said elongated portion of the first member, and means secured to the end of the elongated portion of the first member and located in the socket of the second member, said means having a radial portion disposed in the same circumferential plane as said radial lug on the second member and adapted to engage therewith when rotative movement of one member exceeds that of the other beyond a predetermined degree, said last means being also adapted to maintain the operative relation between the two members.

2. A coupler of the character described, comprising a member adapted to be secured to the end of a shaft, said member being provided with an elongated portion or spindle, while the base of said member is provided with a circumferential groove disposed about said elongated portion, a second member adapted to be secured to the end of a second aligned shaft, said member being apertured to receive the end of the elongated portion of the first member so as to rotate thereon, while the base of said second member is provided with a circumferential groove on the side disposed toward the first member, the opposite or shaft-attaching side of the second member being socketed about the elongated portion receiving aperture, a coil spring disposed about the elongated portion of the first member, with the end coils thereof seated in the circumferential grooves of the two members so as to prevent lateral outward movement of the end coils, while the ends of the spring are disposed parallel with the longitudinal axis of the spring and secured to the base of each member, and means secured to the end of the elongated portion so as to rotate therewith and located within the socket of the second member to maintain operative relation between the members, said means and the second member being provided with correlated surfaces adapted to form interlocking relation between the two members when the rotative movement of one member exceeds that of the other beyond a predetermined degree.

3. A coupler of the character described, adapted to be interposed between the ends of two aligned shafts and comprising a member provided with an elongated spindle, a second member provided with an apertured hub adapted to receive the end of said spindle and to rotate thereon, the opposing faces of said members being provided with circumferential grooves, while the outer face of the second member is socketed about the spindle-receiving aperture, a third member keyed to the end of the spindle so as to rotate with the first member and arranged in the socket of the second member, the second member and said third member being provided with lugs disposed in the same circumferential plane so as to provide an interlocking relation between the members when rotative movement of the members, relative to each other, is in excess of a predetermined degree, means whereby longitudinal movement of the members in separating direction is prevented, and a coil spring disposed about the spindle and hub of the first two members, the end coils of the springs being seated in the circumferential grooves of the first and second members, with the ends of the springs disposed parallel with the longitudinal axis of the spring and secured, respectively, to said two members.

4. A coupler of the character described, comprising a member provided with an elongated spindle, a second member rotatably mounted on the end of said spindle, the outer surface of said second member being provided with a circumferential socket disposed about the spindle-receiving opening in said second member, a third member keyed to the spindle of the first member and located in the circumferential socket of the second member, both the second and third members being provided with radially disposed lugs disposed within the circumferential socket and normally in spaced circumferential relation with each other, and a resilient driving connection disposed about said spindle and operatively connected to said first and second members.

5. A coupler of the character described, comprising a pair of members, one of which is made elongated while the other is apertured to receive the end of the elongated member and adapted to rotate thereon, the apertured member being socketed on its outer surface and provided with a sectoral lug disposed toward the end of the elongated member, a disc secured to the end of the elongated member to rotate therewith and located in the socket of the second member, said disc being provided with a sectoral lug disposed beyond the perimeter of the disc and adapted to engage with the lug of the second mentioned member when the difference in rotation of the two members exceeds a predetermined degree, and a coiled spring disposed about the elongated member, with its ends arranged parallel with the longitudinal axis of the spring and secured, respectively, to both members, said spring being adapted to yieldingly transmit the rotative movement of one member to the other.

6. A coupler of the character described, comprising a member adapted to be secured to the end of a shaft and provided with an elongated spindle portion, a second member adapted to be secured to the end of a second, aligned shaft, said second member being provided with a hub adapted to have the end of the spindle portion of said first member disposed therethrough and free to rotate thereon, a washer member adapted to be secured in a predetermined position against independent rotation on the outer end of said spindle portion, the washer and said second member being provided with correlated surfaces disposed in the same circumferential plane, whereby an interlocking relation between the first and second members is provided when rotation of the one exceeds the other to a predetermined degree, and a coil-spring disposed about said spindle portion, with the ends of the spring secured, respectively, to the first and second members whereby the torque of the spring is adapted to yieldingly transmit the movement of one member to the other.

IRVIN HUPP.

Witnesses:
  M. E. REYNOLDS,
  G. HEIDMAN.